United States Patent
Byun et al.

(10) Patent No.: US 11,338,788 B2
(45) Date of Patent: May 24, 2022

(54) APPARATUS AND METHOD FOR CONTROLLING FUEL INJECTION OF HYBRID ELECTRIC VEHICLE

(71) Applicants: HYUNDAI MOTOR COMPANY, Seoul (KR); KIA MOTORS CORPORATION, Seoul (KR)

(72) Inventors: Jungsup Byun, Seongnam-si (KR); Seungwoo Lee, Seoul (KR); Chan Hee Won, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 299 days.

(21) Appl. No.: 16/734,665

(22) Filed: Jan. 6, 2020

(65) Prior Publication Data

US 2021/0129823 A1 May 6, 2021

(30) Foreign Application Priority Data

Oct. 31, 2019 (KR) .......................... 10-2019-0137498

(51) Int. Cl.
*B60W 10/06* (2006.01)
*B60W 10/08* (2006.01)
(Continued)

(52) U.S. Cl.
CPC ............ *B60W 10/06* (2013.01); *B60W 10/02* (2013.01); *B60W 10/08* (2013.01); *B60W 20/10* (2013.01);
(Continued)

(58) Field of Classification Search
CPC ...... B60W 10/00; B60W 10/02; B60W 10/04; B60W 10/06; B60W 10/08; B60W 20/00;
(Continued)

(56) References Cited

U.S. PATENT DOCUMENTS

2001/0004203 A1* 6/2001 Matsubara ............ B60W 10/02
322/16
2003/0089326 A1* 5/2003 Ujifusa ............... F02N 11/0818
123/179.4

(Continued)

FOREIGN PATENT DOCUMENTS

JP 2012-086773 A 5/2012
JP 5742166 B2 7/2015
(Continued)

*Primary Examiner* — Geepy Pe
*Assistant Examiner* — Michael Allen Brace, Jr.
(74) *Attorney, Agent, or Firm* — McDonnell Boehnen Hulbert & Berghoff LLP (57) ABSTRACT

Fuel injection of a hybrid electric vehicle including an engine and a transmission may be controlled by a method including, determining to release coasting of the hybrid electric vehicle based on a brake pedal operation, determining whether a fuel injection suspending condition is satisfied based on vehicle running state data, suspending fuel injection when the vehicle running state data satisfies the fuel injection suspending condition, performing an engagement control of the transmission while the fuel injection is suspended, determining whether a fuel injection suspension release condition is satisfied, determining whether the engine and the transmission are directly coupled when the fuel injection suspension release condition is satisfied, and initiating fuel injection of the engine when the engine and the transmission are directly coupled.

14 Claims, 4 Drawing Sheets

(51) Int. Cl.
*B60W 10/02* (2006.01)
*B60W 30/18* (2012.01)
*B60W 20/10* (2016.01)
*B60W 20/40* (2016.01)

(52) U.S. Cl.
CPC ....... *B60W 20/40* (2013.01); *B60W 30/18072* (2013.01); *B60W 2030/1809* (2013.01); *B60W 2510/0638* (2013.01); *B60W 2540/10* (2013.01); *B60W 2710/083* (2013.01); *B60Y 2200/92* (2013.01)

(58) Field of Classification Search
CPC ...... B60W 20/10; B60W 20/40; B60W 30/00; B60W 30/18; B60W 30/18009; B60W 30/18072; B60W 2030/18081; B60W 2030/1809; B60W 2510/00; B60W 2510/02; B60W 2510/0208; B60W 2510/06; B60W 2510/0638; B60W 2540/00; B60W 2540/10; B60W 2710/00; B60W 2710/06; B60W 2710/0666; B60W 2710/08; B60W 2710/083; B60Y 2200/00; B60Y 2200/90; B60Y 2200/92
See application file for complete search history.

(56) References Cited

U.S. PATENT DOCUMENTS

| 2007/0078040 | A1* | 4/2007 | Nobumoto | F02N 19/00 477/70 |
| 2011/0053735 | A1* | 3/2011 | Lewis | F02N 5/04 477/99 |
| 2013/0151129 | A1* | 6/2013 | Tatewaki | F02D 45/00 701/112 |

FOREIGN PATENT DOCUMENTS

| JP | 2016-130105 A | 7/2016 |
| JP | 2017-128167 A | 7/2017 |
| JP | 2018-103740 A | 7/2018 |
| KR | 10-1433562 B1 | 8/2014 |

* cited by examiner

APPARATUS AND METHOD FOR CONTROLLING FUEL INJECTION OF HYBRID ELECTRIC VEHICLE

CROSS-REFERENCE TO RELATED APPLICATION

This application claims priority to and the benefit of Korean Patent Application No. 10-2019-0137498 filed in the Korean Intellectual Property Office on Oct. 31, 2019, the entire contents of which are incorporated herein by reference.

BACKGROUND

(a) Field

The present disclosure relates to an apparatus and a method for controlling fuel injection of a hybrid electric vehicle.

(b) Description of the Related Art

A hybrid vehicle is provided with power sources of an engine and a drive motor, and is driven by a combination of a drive torque generated by combustion of the engine and a drive torque generated by the drive motor by electrical energy retrieved from a battery.

Hybrid vehicles may be classified into parallel, series, and hybrid types according to the driving scheme, and may be classified into a mild type and a hard type according to the power ratio of the engine and the driving motor.

The hybrid vehicle of the hard type is provided with a start-generator that may start the engine or may generate electricity by the output of the engine and also with a drive motor which drives the vehicle.

Mild type hybrid vehicles (also referred to as mild hybrid vehicles) typically use low-capacity batteries and drive motors compared with hard type hybrid vehicles. That is, the mild hybrid electric vehicle is provided with a mild hybrid starter-generator (MHSG) instead of an alternator.

Hybrid vehicles can maximize fuel efficiency by cutting fuel supply to the engine during coasting driving and by cutting off transmission of power of the transmission.

The hybrid vehicle then releases coasting when the driver presses a brake pedal or an accelerator pedal.

It will be beneficial when an unnecessary fuel injection is removed in the case of releasing the coasting control of the hybrid electric vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a method and an apparatus for controlling fuel injection of a hybrid electric vehicle having advantages of suspending fuel injection when a start/stop coasting is released, thereby improving fuel efficiency of a hybrid electric vehicle.

An exemplary method for controlling fuel injection of a hybrid electric vehicle including an engine and a transmission may include, determining to release coasting of the hybrid electric vehicle based on a brake pedal operation, determining whether a fuel injection suspending condition is satisfied based on vehicle running state data, suspending fuel injection when the vehicle running state data satisfies the fuel injection suspending condition, performing an engagement control of the transmission while the fuel injection is suspended, determining whether a fuel injection suspension release condition is satisfied, determining whether the engine and the transmission are directly coupled when the fuel injection suspension release condition is satisfied, and initiating fuel injection of the engine when the engine and the transmission are directly coupled.

In the determining of whether the fuel injection suspending condition is satisfied, it may be determined whether a transmission speed of the vehicle running state data is below a first predetermined value, whether a speed difference value between an engine speed and the transmission speed is below a second predetermined value, and whether a vehicle speed is within a predetermined speed range.

In the determining of whether the fuel injection suspension release condition is satisfied, it may be determined whether an elapsed time from a time point when the fuel injection is suspended is greater than or equal to a predetermined time preset dependent on a vehicle speed and a transmission speed.

In the determining of whether the fuel injection suspension release condition is satisfied, it may be determined whether an elapsed time from a time point finished with the engagement control of the transmission is greater than or equal to a predetermined time.

In the determining of whether the fuel injection suspension release condition is satisfied, it is determined, while suspending the fuel injection, whether an accelerator pedal position value of the vehicle running state data exceeds a reference value, whether an engine speed is a below a reference rotation speed, and whether a shift-stage of the transmission is changed.

An exemplary method for controlling fuel injection of a hybrid electric vehicle may further include, determining whether an engine fuel-cut condition is satisfied when the engine and the transmission is directly coupled, wherein the initiating of the fuel injection of the engine is performed when the engine fuel-cut condition is not satisfied.

An exemplary method for controlling fuel injection of a hybrid electric vehicle may further include, performing a fuel-cut control in response to satisfying of the engine fuel-cut condition.

An exemplary apparatus for controlling fuel injection of a hybrid electric vehicle having an engine may include, an injector configured to inject fuel into the engine, a transmission configured to selectively receive a driving torque from the engine via a clutch device and to transmit the driving torque to a drive-wheel, a brake pedal operation detector configured to detect a brake pedal operation, a vehicle running state detection unit configured to detect vehicle running state data used for controlling the hybrid electric vehicle, and a vehicle controller configured to control the injector, the transmission, and the engine based on the brake pedal operation and the vehicle running state data. The vehicle controller may determine to release a coasting of the hybrid electric vehicle based on a brake operation signal supplied from the brake pedal operation detector, and may determine whether a fuel injection suspending condition is satisfied based on the vehicle running state data. When the vehicle running state data satisfies the fuel injection suspending condition, the vehicle controller may suspend fuel injection of the engine, and may perform an engagement control of the clutch device while suspending the fuel injection of the engine. The vehicle controller may determine whether the fuel injection suspension release condition is satisfied by the vehicle running state data, and when the fuel injection suspension release condition is satisfied by the vehicle running state data, the vehicle controller may restart fuel injection of the engine.

According to an exemplary embodiment of the present disclosure, fuel injection may be suspended when the fuel injection is not necessary, thereby improving fuel efficiency of the hybrid electric vehicle.

In addition, by suspending fuel injection when a start/stop coasting is released by an operation of a brake pedal, drivability may be improved.

Other effects that may be obtained or are predicted by an exemplary embodiment of the present disclosure will be explicitly or implicitly described in a detailed description of the present disclosure. That is, various effects that are predicted according to an exemplary embodiment of the present disclosure will be described in the following detailed description.

DETAILED DESCRIPTION OF THE EMBODIMENTS

Hereinafter, an apparatus and a method for controlling fuel injection of a hybrid electric vehicle according to an exemplary embodiment is described in detail with reference to the drawings. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

Further, in the description of exemplary embodiments of the present disclosure, the detailed description of related well-known configurations and functions is not provided when it is determined as unnecessarily making the scope of the present disclosure unclear. In addition, the terminologies to be described below are ones defined in consideration of their function in an exemplary embodiment of the present disclosure and may be changed by the intention of a user, an operator, or a custom. Therefore, their definition should be made on the basis of the description of the present disclosure.

Further, in the following exemplary embodiments, the terminologies are appropriately changed, combined, or divided so that those skilled in the art can clearly understand them, in order to efficiently explain the main technical characteristics of the present disclosure, but the present disclosure is not limited thereto.

Hereinafter, exemplary embodiments of the present disclosure will be described in detail with reference to the accompanying drawings.

Figure 1:
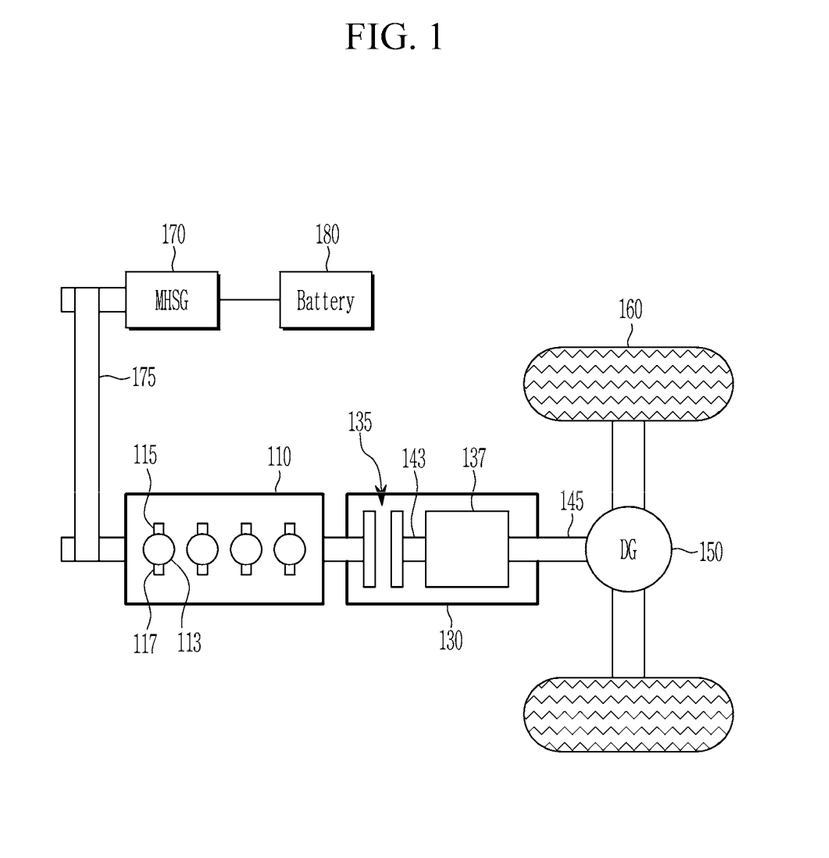
FIG. 1 is a schematic diagram illustrating a hybrid electric vehicle that may be applied with a method for controlling fuel injection according to an exemplary embodiment.

FIG. 1 is a schematic diagram illustrating a hybrid electric vehicle that may be applied with a method for controlling fuel injection according to an exemplary embodiment. Hereinafter, a mild hybrid electric vehicle is taken as an example of hybrid electric vehicles. However, the present disclosure is not limited thereto, and it may be understood that another type of hybrid vehicle may be applied with the disclosure when the hybrid vehicle may perform coasting driving.

Referring to FIG. 1, a hybrid electric vehicle applicable with a method for controlling fuel injection according to an exemplary embodiment includes an engine 110, a transmission 130, a differential device 150 (e.g., a differential gear abbreviated as DG in FIG. 1), a drive-wheel 160, a mild hybrid starter-generator (MHSG) 170, and a battery 180.

The engine 110 generates a torque by combustion of fuel. That is, the engine 110 transforms a chemical energy of the fuel to a mechanical energy, by combustion of the fuel with the air. The engine 110 may control a generated torque by controlling an ignition timing, an intake air amount, a fuel amount, an air/fuel ratio, etc.

Various types of engines, such as a gasoline engine, a diesel engine, a liquefied petroleum injection (LPI) engine, may be used as the engine 110.

The engine 110 includes a combustion chamber 113, an ignition device 115, and an injector 117 for respective cylinders.

The combustion chamber 113 introduces fuel and air, the ignition device 115 ignites the fuel and air introduced into the combustion chamber 113, and the injector 117 injects fuel into the combustion chamber 113.

The torque generated by the engine 110 of the hybrid electric vehicle is delivered to an input shaft 143 of the transmission 130 through the clutch device 135, and a torque outputted from an output shaft 145 of the transmission 130 is delivered to a driveshaft through a differential device 150. The driveshaft rotates drive-wheels 160, and thereby the hybrid electric vehicle may run by the torque originated by the engine 110.

That is, the transmission 130 shifts and transmits the torque of the engine 110 to the drive-wheels 160.

The transmission 130 shifts the torque of the engine 110 according to a driver's manual operation of a shift lever or according to an automatic shifting, and then outputs a drive-torque to the differential device 150.

The transmission 130 may include a clutch device 135 and a gear train 137.

The clutch device 135 may be disposed between the engine 110 and the gear train 137, and selectively connects the engine 110 and the gear train 137.

The clutch device 135 selectively transmits the torque of the engine 110 to the gear train 137. An engagement of the clutch device 135 means that the clutch device 135 interconnects an output shaft of the engine 110 to the gear train 137, and thereby the torque of the engine 110 is transmitted to the gear train 137. A release or disengagement of the clutch device 135 means that the connection of the clutch device 135 to the engine 110 is released or disengaged and thereby the torque of the engine 110 is not transmitted to the gear train 137 of the transmission 130.

Shifting to an appropriate target shift-stage in the gear train 137 may be performed by a driver's operation of the shift lever or automatically by the gear train 137 according to a running state of the vehicle.

The MHSG 170 may convert an electrical energy to a mechanical energy, or a mechanical energy to an electrical energy. In more detail, the MHSG 170 may start the engine 110, or may generate electricity by being driven by the torque of the engine 110. The torque of the MHSG 170 may be used as an auxiliary driving torque in addition to the engine 110.

The MHSG 170 may be connected to the engine 110 by a belt 175.

The hybrid electric vehicle may use the power of the engine 110 as a primary power source, and may also use the power of the MHSG 170 as an auxiliary power source.

The battery 180 may supply electrical energy to the MHSG 170, or may be recharged by electricity supplied by the MHSG 170. The battery 180 may be a high voltage battery (e.g., 48V battery), and may be a lithium-ion battery.

Figure 2:
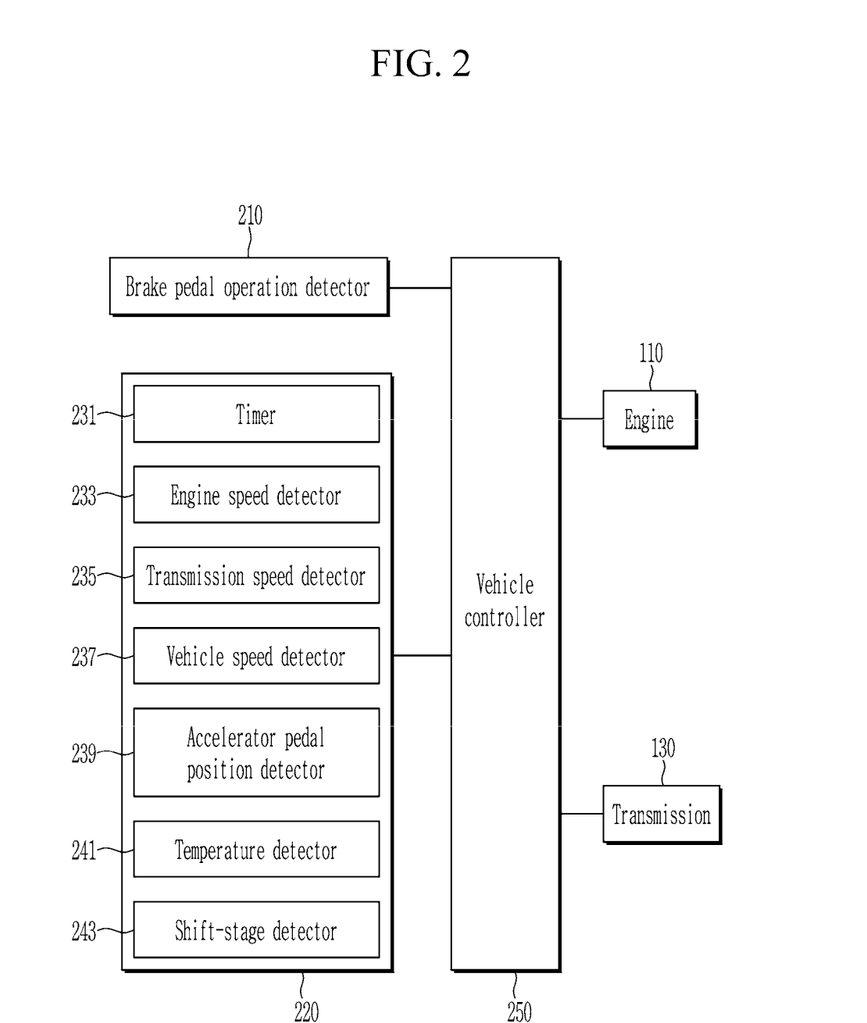
FIG. 2 is a block diagram of an apparatus for controlling fuel injection according to an exemplary embodiment.

FIG. 2 is a block diagram of an apparatus for controlling fuel injection according to an exemplary embodiment.

Referring to FIG. 2, an exemplary apparatus for controlling fuel injection includes a brake pedal operation detector 210, a vehicle running state detection unit 220, a vehicle controller 250, and a transmission 130.

The brake pedal operation detector 210 detects an operation of a brake pedal of the hybrid electric vehicle, and generates a brake operation signal. The brake pedal operation detector 210 may be configured to detect ON or OFF of the brake pedal, or may be configured to detect a position value of the brake pedal (i.e., depressed level of the brake pedal). For example, when the brake pedal is fully depressed, the position value of the brake pedal may be 100%. When the brake pedal is not depressed, the position value of the brake pedal may be 0%.

The brake pedal operation detector 210 supplies the brake operation signal to the vehicle controller 250.

The vehicle running state detection unit 220 detects vehicle running state data used for controlling the fuel injection. For such a purpose, the vehicle running state detection unit 220 may include a timer 231, an engine speed detector 233, a transmission speed detector 235, a vehicle speed detector 237, an accelerator pedal position detector 239, a temperature detector 241, and a shift-stage detector 243.

The timer 231 measures a time elapsed from a specific time point under the control of the vehicle controller 250, and provides the elapsed time to the vehicle controller 250.

The engine speed detector 233 detects a rotation speed of the engine 110. The engine speed detector 233 may be installed at the output shaft of the engine 110.

The engine speed detector 233 provides the detected engine speed to the vehicle controller 250.

The transmission speed detector 235 detects a rotation speed of the transmission 130. The transmission speed detector 235 may detect a rotation speed of the input shaft 143 of the transmission 130.

The transmission speed detector 235 provides the detected transmission speed to the vehicle controller 250.

The vehicle speed detector 237 detects a vehicle speed of the hybrid electric vehicle, and provides the detected vehicle speed to the vehicle controller 250.

The vehicle speed detector 237 may be installed at the drive-wheel 160 of the hybrid electric vehicle.

The accelerator pedal position detector 239 detects a depressed level of the accelerator pedal depressed by a driver. That is, the accelerator pedal position detector 239 detects a position value of the accelerator pedal (i.e., a depressed level of the accelerator pedal), and provides a corresponding accelerator position signal to the vehicle controller 250. For example, when the accelerator pedal is fully depressed, the position value of the accelerator pedal may be 100%. When the accelerator pedal is not depressed, the position value of the accelerator pedal may be 0%.

Instead of using the accelerator pedal position detector 239, it is possible to employ a throttle valve opening detector installed in an intake air path. Therefore, the term accelerator pedal position detector may be interpreted to cover a throttle valve opening detector, in the description and the claims.

The temperature detector 241 detects a temperature of the transmission 130. In more detail, the temperature detector 241 may detect a fluid temperature of the transmission 130 as a transmission temperature, and may provide the detected transmission temperature to the vehicle controller 250.

The shift-stage detector 243 detects a current shift-stage of the transmission, either automatically engaged according to the driving state of the hybrid electric vehicle or selected by a driver's operation of a shift lever, and provides the detected shift-stage to the vehicle controller 250.

The vehicle controller 250 controls the engine 110 and the transmission 130 based on data received from the brake pedal operation detector 210 and the vehicle running state detection unit 220.

In more detail, the vehicle controller 250 may release a coasting of the hybrid electric vehicle based on the brake operation signal supplied from the brake pedal operation detector 210. The coasting of the hybrid electric vehicle may be a start/stop Coasting (SSC).

It may be understood that, in the start/stop coasting of a hybrid electric vehicle, the engine may be stopped to improve fuel efficiency while the vehicle is coasting, e.g., when rolling at almost a same speed without applying a driving force. In such a start/stop coasting of the hybrid electric vehicle, it may be supposed to immediately restart the engine when the SSC is released by a driver's interruption such as pressing a brake pedal or an accelerator pedal. However, according to an embodiment, the engine is not immediately restarted upon releasing of the SSC in response to a driver's pressing the brake pedal, and performs a sequence of process to control restarting of the engine after determining to release the SSC of the hybrid electric vehicle.

The vehicle controller 250 receives the vehicle running state data from the vehicle running state detection unit 220, and determines whether a fuel injection suspending condition is satisfied, based on the received vehicle running state data. When the vehicle running state data satisfies the fuel injection suspending condition, the vehicle controller 250 suspends fuel injection of the injectors 117 of the engine 110, and thereby the restarting of the engine 110 is suspended.

The vehicle controller 250 may perform an engagement control of the transmission 130. That is, the vehicle controller 250 may control a shifting operation of the transmission 130. The vehicle controller 250 determines whether a fuel injection suspension release condition is satisfied, based on the vehicle running state data. When the vehicle running state data satisfies the fuel injection suspension release condition, the vehicle controller 250 may control the injector 117 to inject fuel to restart the engine 110. When restarting the engine 110, the engine 110 and the transmission 130 may be directly coupled by an engagement of the clutch 135.

The vehicle controller 250 may be implemented as at least one microprocessor operating by a predetermined program, and the predetermined program may include instructions for executing a method for controlling fuel injection of a hybrid electric vehicle according to an exemplary embodiment of the present disclosure.

Hereinafter, a method for controlling fuel injection according to an exemplary embodiment is described in detail with reference to FIG. 3 to FIG. 4.

Figure 3:
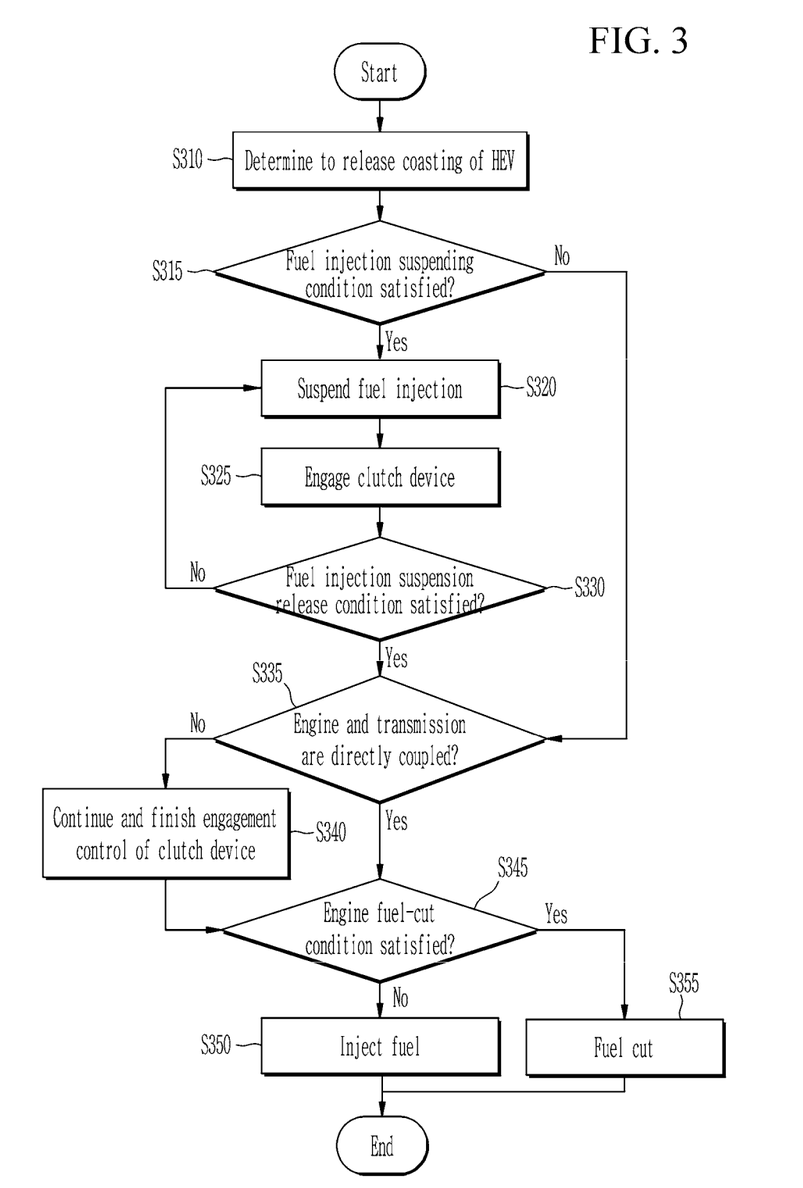
FIG. 3 is a flowchart showing a method for controlling fuel injection according to an exemplary embodiment.

FIG. 3 is a flowchart showing a method for controlling fuel injection according to an exemplary embodiment.

At step S310, the vehicle controller 250 determines to release coasting of the hybrid electric vehicle based on a brake pedal operation. Prior to the step S310, the vehicle controller 250 is controlling the hybrid electric vehicle at a coasting driving. In such a coasting of the hybrid electric vehicle, the clutch device 135 is released, i.e., disengaged, by the vehicle controller 250, such that the engine 110 and the transmission 130 is disconnected.

In this case, at the step S310, when a driver operates the brake pedal, the brake pedal operation detector 210 detects the driver's brake pedal operation, and provides the brake operation signal to the vehicle controller 250. The brake operation signal may be an ON/OFF signal or may have a position value of the brake pedal.

The vehicle controller 250 receives the brake pedal operation from the brake pedal operation detector 210.

While the hybrid electric vehicle is coasting, the vehicle controller 250 determines to release the coasting of the hybrid electric vehicle based on the brake operation signal. For example, the vehicle controller 250 may determine to release the coasting of the hybrid electric vehicle when the brake operation signal is ON or when the brake operation signal has a brake pedal position value greater than a predetermined position value. The predetermined position value may be preset to an appropriate value to release coasting.

Subsequently at step S315, the vehicle controller 250 determines whether the vehicle running state data satisfies a fuel injection suspending condition.

In more detail, the vehicle controller 250 determines that the fuel injection suspending condition is satisfied, in the case that the transmission speed of the vehicle running state data is below a first predetermined value, a speed difference value between the engine speed and the transmission speed is below a second predetermined value, and the vehicle speed is within a predetermined speed range. One or more further conditions, such as the injector 117 should normally operate (i.e., not mal-functional), and/or the brake pedal and MHSG 170 should normally operate (i.e., not mal-functional), may be added to the above fuel injection suspending condition.

The first predetermined value may be preset to an appropriate value depending on a vehicle speed, since the transmission speed (i.e., the rotation speed of the input shaft 143 of the transmission 130) may vary according to the vehicle speed. For example, the first predetermined value may be a fuel-cut rpm, above which a fuel-cut control of the engine is performed when a throttle valve is OFF. It may be understood that the fuel-cut control is performed until the engine rpm drops under the fuel-cut rpm while the engine speed is decreasing due to throttling off of the engine. Thus, by setting the first predetermined value to be the fuel-cut rpm of the engine, unnecessary injection of fuel may be obviated since the engine speed may be above the fuel-cut rpm when the engine forcedly restarted by injecting fuel into the engine, in which case the engine should be turned off again soon after restarted.

The speed difference value between the engine speed and the transmission speed may be a speed difference value of the output shaft of the engine 110 and the input shaft 143 of the transmission. Such a speed difference may mean a slip speed of the clutch device 135. When the speed difference of the engine and the transmission is above the second predetermined value, that is, when the slip speed of the clutch device 135 is excessively high, the engine speed may not be fully recovered by an engagement control of the clutch device 135, meaning that a slipping state of the clutch device 135 may be maintained for an excessively long period, by which the clutch device 135 may be damaged. Thus, the second predetermined value may be set to be a speed difference value that may be recovered by the engagement control of the clutch device 135 within a predetermined period or without causing damage to the clutch device 135. Such a second predetermined value may be preset dependent on the vehicle speed and the transmission temperature.

The predetermined speed range may be set to be from a first reference speed to a second reference speed, to exclude the case that the vehicle speed is excessively low or excessively high.

In addition, the vehicle controller 250 may further determine whether a fault signal is occurring from the brake pedal operation detector 210 and/or the transmission speed detector 235, and may determine that the fuel injection suspending condition is satisfied only when the fault signal is not existent.

When the vehicle running state data does not satisfy the fuel injection suspending condition (S315—No), the vehicle controller 250 proceeds to step S335, which is later described in detail.

When the vehicle running state data satisfies the fuel injection suspending condition (S315—Yes), the vehicle controller 250 suspends, at step S320, fuel injection of the injector 117. By suspending the fuel injection after determining to release coasting of the hybrid electric vehicle, an unnecessary fuel injection may be prevented thereby improving fuel efficiency.

At step S325, while suspending the fuel injection, the vehicle controller 250 performs an engagement control of the transmission 130, more specifically, of the clutch device 135. At the step S325, the vehicle controller 250 may increase the engine speed by performing the engagement control (e.g., slip control) of the clutch device 135 of the transmission 130. That is, the rotation speed of the engine 110 may be increased by the engagement control of the clutch device 135 due to the inertial momentum of the hybrid electric vehicle, without utilizing a separate power source such as the MHSG 170.

At step S330, the vehicle controller 250 determines whether the vehicle running state data satisfies a fuel injection suspension release condition.

In an embodiment, the vehicle controller 250 may calculate a first elapsed time from a time point finished with the engagement control of the transmission 130, and may determine that the fuel injection suspension release condition is satisfied when the first elapsed time is greater than or equal to a first predetermined time. The first predetermined time may be set to an appropriate time to exclude the case that the fuel injection suspension is maintained for an excessively long period after the engagement of the clutch device 135.

Additionally or alternatively, the vehicle controller 250 may calculate a second elapsed time from a time point when the fuel injection is suspended, and may determine that the fuel injection suspension release condition is satisfied when the second elapsed time is greater than or equal to a second predetermined time. The second predetermined time may be preset dependent on the vehicle speed and the transmission speed.

Additionally or alternatively, the vehicle controller 250 may determine, while suspending the fuel injection, whether the accelerator pedal position value of the vehicle running state data exceeds a reference value, whether the engine speed is below a reference rotation speed while the engine 110 is driven, or whether the shift-stage of the transmission 130 is changed, e.g., by a driver. The vehicle controller 250 may determine that the fuel injection suspension release condition is satisfied when the accelerator pedal position value of the vehicle running state data exceeds the reference value, when the engine speed is below the reference rotation speed while the engine 110 is driven, or when the shift-stage of the transmission 130 is changed, e.g., by a driver.

When the accelerator pedal position value has non-zero value above the reference value, it may be interpreted that the driver has an intention to obtain power from the engine 110. Thus, in this case, it will be appropriate to release the fuel injection suspension of the engine 110 and initiate to supply fuel to the engine 110.

The reference rotation speed may be a fuel-cut release rpm of the engine when the engine speed is dropping while a throttle valve is OFF. It may be understood that, when the engine speed becomes below a certain rpm close to an idle rpm during a fuel-cut control with the throttle valve closed, fuel injection may preferably be restarted in order to prevent an abnormal decrease of the engine speed below the idle speed. Thus, the reference rotation speed may be set as a reference rpm where the fuel injection is restarted during the fuel-cut control with the closed throttle valve.

Additionally or alternatively, the vehicle controller 250 may determine that the fuel injection suspension release condition is satisfied when a torque request is received from another vehicle control component of the hybrid electric vehicle. The vehicle control component of the hybrid electric vehicle may be an anti-lock brake system (ABS), a traction control system (TCS), or an electronic stability control (ESC). That is, while suspending fuel injection of the engine 110, the vehicle controller 250 may immediately restart fuel injection of the engine 110 when it is requested by another vehicle control component that the engine 110 should output an appropriate power.

While the vehicle running state data does not satisfy the fuel injection suspension release condition (S330—No), the vehicle controller 250 may proceed to the step S320 to maintain suspending of the fuel injection of the engine 110.

When the vehicle controller 250 determines that the vehicle running state data satisfies the fuel injection suspension release condition (S330—Yes) then the vehicle controller 250 determines, at step S335, whether the engine 110 and the transmission 130 are directly coupled. Here, the direct coupling of the engine 110 and the transmission 130 means that there is not slip between the engine 110 and the transmission 130, i.e., at the clutch device 135. It may be understood that the fuel injection suspension release condition may be promptly satisfied before the engagement control of the clutch device 134 is finished after initiated at the step S325. Therefore, at the step S335, the vehicle controller 250 may check whether the engagement control of the step S325 has been finished.

When the engine 110 and the transmission 130 are not directly coupled (S335-No), the vehicle controller 250 continues or finishes the ongoing engagement control of the clutch device 135 at step S340.

When the engine 110 and the transmission 130 are directly coupled, the vehicle controller 250 determines, at step S345, whether an engine fuel-cut condition is satisfied based on the vehicle running state data.

At the step S345, the vehicle controller 250 may determine whether the engine speed is above a highest limit of the engine speed. It may be understood that an engine speed is forcedly limited below a specific rpm to prevent a damage to the engine, which is often called a redline rpm. Thus, the vehicle controller 250 may determine that the engine fuel-cut condition is satisfied when the engine speed is above the highest limit. It may be understood that, the SSC may be released at the step 310 by a driver's operation of a brake pedal, and fuel injection may be suspended at the step S320 when the fuel injection suspension condition is satisfied. Then, when the driver shifts the shift-stage of the transmission 130, for example, lower the gear, then the fuel injection suspension release condition is satisfied at the step S330, and the transmission 130 will shift the gear according to the driver's request. In this case, lowering the gear implies increase of the engine speed, and it may be possible that the engine speed after changing the gear may be above the highest limit. Therefore, by the step S345, the vehicle controller 250 may check whether the engine speed is excessively high for injecting fuel.

When the engine fuel-cut condition is not satisfied (S345—No), e.g., when the engine speed is not excessively high above the highest limit, the vehicle controller 250 initiates, at step S350, fuel injection of the engine 110.

When the engine fuel-cut condition is satisfied (S345—Yes), e.g., when the engine speed is excessively high above the highest limit, the vehicle controller 250 prevents, at step S355, fuel injection of the engine 110. That is, at the step S355, the vehicle controller 250 performs the fuel-cut control in response to satisfying of the engine fuel-cut condition, and the fuel injection of the engine 110 may remain uninitiated. In this case, fuel injection may be initiated according to a normal engine control, for example, when the engine speed decreases to become below the highest limit.

Figure 4:
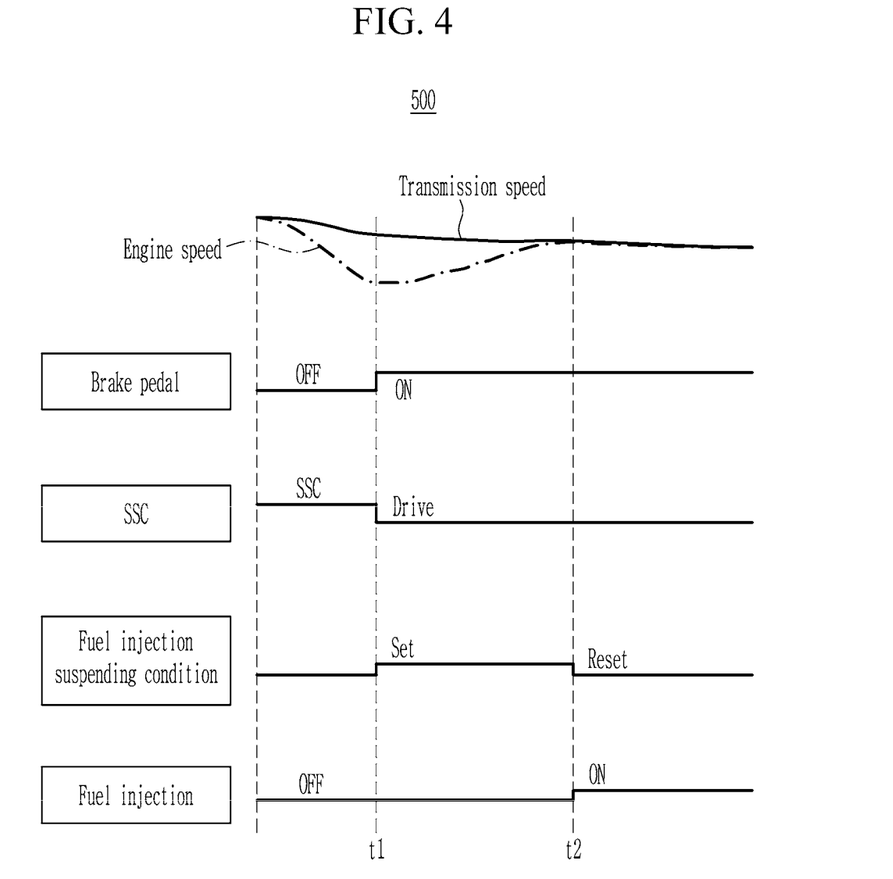
FIG. 4 is a graph showing various signals in a method for controlling fuel injection according to an exemplary embodiment.

FIG. 4 is a graph showing various signals in a method for controlling fuel injection according to an exemplary embodiment.

Referring to FIG. 4, according to a method for controlling fuel injection according to an exemplary embodiment, an on-going SSC control is determined to be released at a first time point t1 due to an operation of a brake pedal (brake operation signal—ON). At this time, when the vehicle running state data satisfies the fuel injection suspending condition, fuel injection is suspended, i.e., a state that fuel is not injected is maintained. By an engagement control of the clutch device 135, the engine speed is increased to become close to the transmission speed. An elapsed time from the first time point t1 is monitored and compared with a predetermined time (e.g., t2–t1). At a second time point t2, where the elapsed time becomes greater than or equal to the predetermined time, the fuel injection of the engine is started. Therefore, an unnecessary fuel injection between the two time points t1 and t2 may be prevented, and thereby fuel efficiency of the hybrid electric vehicle may be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A method for controlling fuel injection of a hybrid electric vehicle including an engine and a transmission, the method comprising:
   determining to release coasting of the hybrid electric vehicle based on a brake pedal operation;
   determining whether a fuel injection suspending condition is satisfied based on vehicle running state data;
   suspending fuel injection when the vehicle running state data satisfies the fuel injection suspending condition;

performing an engagement control of the transmission while the fuel injection is suspended;

determining whether a fuel injection suspension release condition is satisfied;

determining whether the engine and the transmission are directly coupled when the fuel injection suspension release condition is satisfied; and initiating fuel injection of the engine when the engine and the transmission are directly coupled;

wherein the determining of whether the fuel injection suspending condition is satisfied comprises determining whether a transmission speed of the vehicle running state data is below a first predetermined value, whether a speed difference value between an engine speed and the transmission speed is below a second predetermined value, and whether a vehicle speed is within a predetermined speed range.

2. The method of claim 1, wherein the determining of whether the fuel injection suspension release condition is satisfied comprises determining whether an elapsed time from a time point when the fuel injection is suspended is greater than or equal to a predetermined time preset dependent on a vehicle speed and a transmission speed.

3. The method of claim 1, wherein the determining of whether the fuel injection suspension release condition is satisfied comprises determining whether an elapsed time from a time point finished with the engagement control of the transmission is greater than or equal to a predetermined time.

4. The method of claim 1, wherein, the determining of whether the fuel injection suspension release condition is satisfied comprises determining, while suspending the fuel injection, whether an accelerator pedal position value of the vehicle running state data exceeds a reference value, whether an engine speed is a below a reference rotation speed, and whether a shift-stage of the transmission is changed.

5. The method of claim 1, further comprising, determining whether an engine fuel-cut condition is satisfied when the engine and the transmission is directly coupled, wherein the initiating of the fuel injection of the engine is performed when the engine fuel-cut condition is not satisfied.

6. The method of claim 5, further comprising, performing a fuel-cut control in response to satisfying of the engine fuel-cut condition.

7. An apparatus for controlling fuel injection of a hybrid electric vehicle having an engine, the apparatus comprising:

an injector configured to inject fuel into the engine;

a transmission configured to selectively receive a driving torque from the engine via a clutch device and to transmit the driving torque to a drive-wheel;

a brake pedal operation detector configured to detect a brake pedal operation;

a vehicle running state detection unit configured to detect vehicle running state data used for controlling the hybrid electric vehicle; and a vehicle controller configured to control the injector, the transmission, and the engine based on the brake pedal operation and the vehicle running state data, wherein the vehicle controller determines to release a coasting of the hybrid electric vehicle based on a brake operation signal supplied from the brake pedal operation detector, and determines whether a fuel injection suspending condition is satisfied based on the vehicle running state data, wherein, when the vehicle running state data satisfies the fuel injection suspending condition, the vehicle controller suspends fuel injection of the engine, and performs an engagement control of the clutch device while suspending the fuel injection of the engine, wherein, the vehicle controller determines whether a fuel injection suspension release condition is satisfied by the vehicle running state data, and when the fuel injection suspension release condition is satisfied by the vehicle running state data, the vehicle controller restarts fuel injection of the engine, and wherein, in the determining of whether the fuel injection suspending condition is satisfied, the vehicle controller determines whether a transmission speed of the vehicle running state data is below a first predetermined value, whether a speed difference value between an engine speed and the transmission speed is below a second predetermined value, and whether a vehicle speed is within a predetermined speed range.

8. The apparatus of claim 7, wherein the first predetermined value is preset dependent on the vehicle speed, and the second predetermined value is preset dependent on the vehicle speed and transmission temperature.

9. The apparatus of claim 7, wherein, in the determining of whether the fuel injection suspension release condition is satisfied, the vehicle controller determines whether an elapsed time of the vehicle running state data is greater than or equal to a predetermined time.

10. The apparatus of claim 9, wherein, in the determining of whether the fuel injection suspension release condition is satisfied, the vehicle controller determines whether an elapsed time from a time point when the fuel injection is suspended is greater than or equal to a predetermined time preset dependent on a vehicle speed and a transmission speed.

11. The apparatus of claim 9, wherein in the determining of whether the fuel injection suspension release condition is satisfied, the vehicle controller determines whether an elapsed time from a time point finished with the engagement control of the clutch device is greater than or equal to a predetermined time.

12. The apparatus of claim 7, wherein, when the fuel injection suspension release condition is satisfied by the vehicle running state data while suspending the fuel injection, the vehicle controller restarts fuel injection of the engine after the clutch device is engaged.

13. The apparatus of claim 12, wherein, in the determining of whether the fuel injection suspension release condition is satisfied, the vehicle controller determines whether an accelerator pedal position value of the vehicle running state data exceeds a reference value, whether the engine speed is below a reference rotation speed while the engine is driven without fuel injection, and whether a shift-stage of the transmission is changed.

14. The apparatus of claim 7, wherein the vehicle running state detection unit comprises:

a timer configured to count time elapsed from a specific time point;

an engine speed detector configured to detect a rotation speed of the engine;

a transmission speed detector configured to detect a rotation speed of the transmission;

a vehicle speed detector configured to a vehicle speed of the hybrid electric vehicle;

an accelerator pedal position detector configured to detect a position value of an accelerator pedal;

a temperature detector configured to detect a temperature of the transmission; and a shift-stage detector configured to a shift-stage of the transmission.

* * * * *